United States Patent [19]
Eriksen

[11] 3,818,765
[45] June 25, 1974

[54] DEVICE FOR STERILE MEASUREMENT OF LIQUID OR GAS PRESSURES

[75] Inventor: Odd Eriksen, Jar, Norway

[73] Assignee: Sentralinstitutt For Industriell Forskning, Oslo, Norway

[22] Filed: Feb. 16, 1972

[21] Appl. No.: 226,802

[30] Foreign Application Priority Data
Feb. 17, 1971   Norway................................. 575/71

[52] U.S. Cl.................. 73/395, 73/406, 128/205 E
[51] Int. Cl. ............................................... G01l 7/08
[58] Field of Search....... 73/406, 395, 398 AR, 431; 128/205 D, 205 E

[56] References Cited
UNITED STATES PATENTS

| | | | |
|---|---|---|---|
| 2,600,324 | 6/1952 | Rappaport | 128/2.05 D |
| 2,667,184 | 1/1954 | Hailer et al. | 73/395 X |
| 2,866,940 | 12/1958 | Lamb | 73/431 X |
| 3,024,649 | 3/1962 | Taber | 73/395 X |
| 3,204,463 | 9/1965 | Taber | 73/398 AR |
| 3,543,586 | 11/1968 | Waite | 73/431 |
| 3,628,526 | 12/1971 | Bigliano | 128/2.05 E |

Primary Examiner—Richard C. Queisser
Assistant Examiner—Daniel M. Yasich
Attorney, Agent, or Firm—Watson, Cole, Grindle & Watson

[57] ABSTRACT

The present invention relates to a pressure measuring device, particularly for sterile medical pressure measurements, and which comprises a pressure sensor with a pressure sensitive membrane and a pressure chamber connectable to the liquid and gas circuit in which the pressure is to be measured, and operative to transfer said liquid and gas pressure to the pressure sensitive membrane. The improvement according to the invention comprises the feature that an impervious isolation membrane of significantly less rigidity than the pressure sensitive membrane is disposed between the latter membrane and the pressure chamber, in order to isolate the sensor from the medium in which the pressure measurements is to be performed. This feature according to the invention substantially facilitates the sterilization procedure for such pressure measuring device without disturbing the measurements, and in addition preferably provides electric insulation between said liquid or gas circuit and the pressure sensor.

1 Claim, 3 Drawing Figures

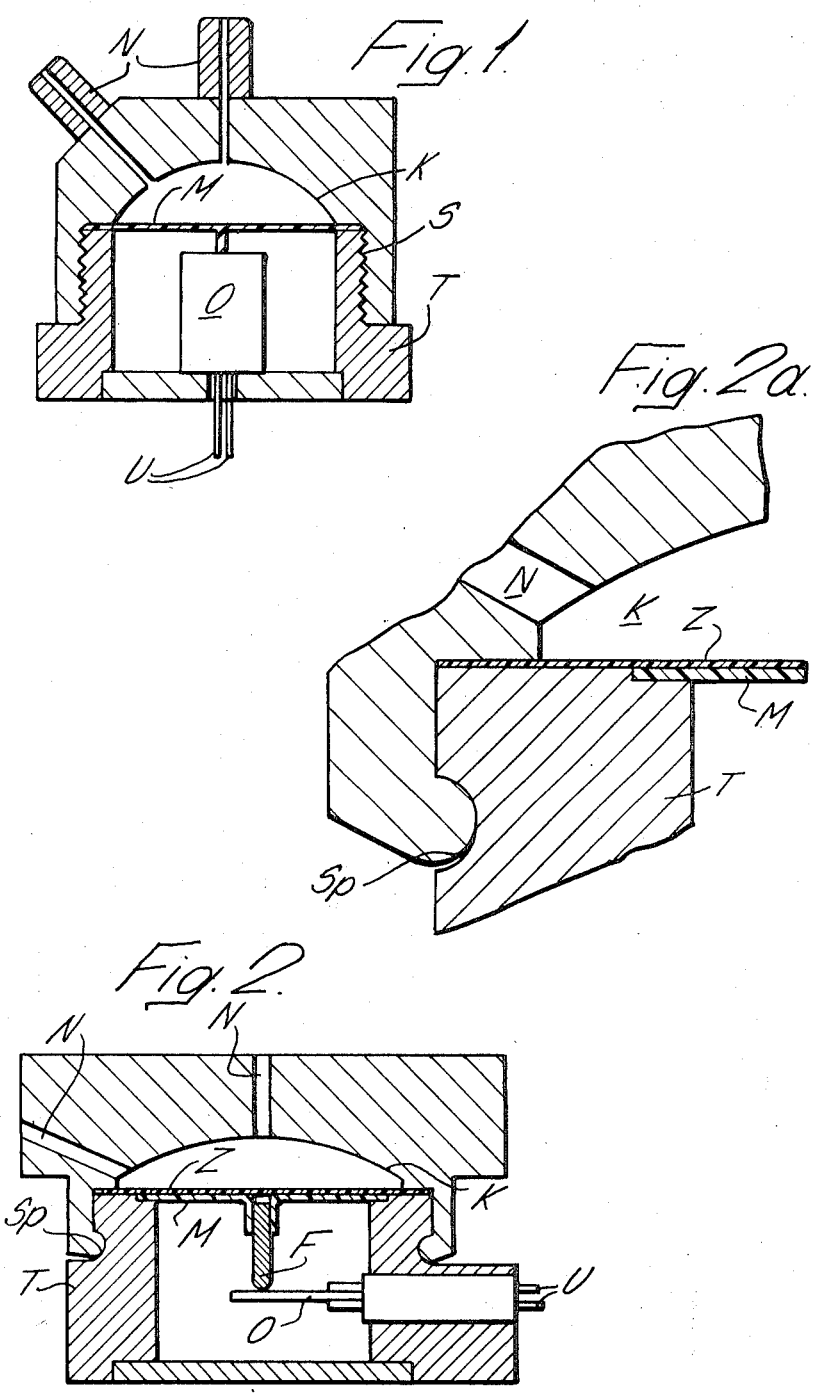

DEVICE FOR STERILE MEASUREMENT OF LIQUID OR GAS PRESSURES

The present invention relates to a device for sterile measurement of liquid or gas pressures, particularly for medical purposes.

Such pressure gauges usually comprise two component parts, namely an open pressure chamber connectable to the gas or liquid circuit in which the pressure is to be measured, and a pressure sensor with a pressure sensitive membrane.

In order to measure the prevailing pressure in said pressure chamber, the pressure sensor is fixed in a gas- or liquidtight manner to the same, e.g. by means of a tapping attachment with a sealing gasket or a suitable snap connection. In this way the membrane of the pressure sensor is brought directly in contact with the medium present in the pressure chamber, for a sensing of said pressure.

Such a device may e.g. be utilized for measuring blood pressure by means of the so-called "bloody method," whereby a cannula or catheter connected to the pressure chamber, is inserted in a blood vessel. To prevent coagulation of the blood, the pressure chamber and the conduit system connecting the same with said cannula or catheter, must be filled with a suitable pressure transfer liquid, so that the blood will not be able to penetrate into the system outside the blood vessels.

Another important application of such devices is the measurement of the dialysis liquid pressure in dialysis apparatus, which e.g. serves as artificial kidneys. In connection with such artificial kidneys it is also of interest to sense the blood pressure by measurement of a gas pressure above an amount of blood enclosed in a chamber. A further application is pressure measurements in connection with respiration outfits.

As all the applications mentioned above concern sterile pressure measurements, both the pressure chamber and the pressure sensor must be sterilized before use.

Such sterilization of said measuring device presents, however, substantial problems, in particular as to the pressure sensor, as few of the commercially available sensor type can endure an autoclave sterilization, due to the high pressure and temperature in the autoclave, or because humidity may damage the sensor. Thus, said sensor is usually only washed in a sterilizing liquid or cleansed by means of a gas sterilization process. Apart from the fact that said processes do not fully comply with strict, medical sterilization claims, they may allow liquid to penetrate into the rather expensive pressure sensor of locations where said liquid may cause damage, which also may happen during said autoclave sterilization of the few sensors which otherwise are fit for such treatment. It is, however, a much greater disadvantage that both said sterilizing methods are very involved, and thus represent loss of time and a labour effort which implies a substantial economic charge.

The much less expensive pressure chamber with its supply leads, is however usually autoclave sterilized to satisfy the security rules and utilized recurrently together with the associated pressure sensor.

The necessity of a routine sterilization of the pressure sensor thus implies substantial disadvantages in relation to the present sterile pressure measurement processes, and further represent an uncertain factor, as the sensor, as indicated above, usually cannot be sterilized in an autoclave.

Thus, the main object of the present invention is to provide a pressure measuring device of such design that the sterilizing of the pressure sensor may be completely avoided.

On this background the invention generally concerns a device for sterile measurement of liquid or gas pressures, particularly for medical purposes, and comprising a pressure chamber connectable to the liquid or gas circuit wherein said pressure measurement is to be made, and a pressure sensor with a pressure sensitive membrane, disposed to sense the prevailing pressure in said chamber, characterized in that the pressure chamber is a closed chamber with one wall constituted by an impervious isolation membrane having substantially less rigidity than the pressure sensitive membrane and mounted in intimate surface contact with said sensitive membrane.

With such embodiment of the measuring device the pressure sensor will not at all be in contact with the medium which is to be subjected to the pressure measuring process, but the pressure may, in spite of this, be transferred to the pressure sensitive membrane, thanks to the feeble rigidity of the isolation membrane compared with the rigidity of the pressure sensitive membrane.

Thus, the relatively expensive and not very rugged pressure sensor may be operated without sterilization throughout its whole operative life, and in this situation it will be very advantageous, according to the invention, to manufacture said closed pressure chamber as an expendable component to be thrown away after the first time's use; whereby also a recurrent sterilization of the chamber is avoided. This may in many instances be an important advantage, as such sterilization usually implies that said chamber, after being appropriately marked, is sent away to be autoclaved and, subsequently to such autoclave sterilization, is returned to the user. Even if such a procedure does not offer any technical difficulties, it is cumbersome and time consuming.

The measuring device according to the present invention thus substantially facilitates pressure measurements of the above type, and thereby satisfies a strongly felt need, particularly because it eliminates all cumbersome labour connected with the returning of sterilized measuring equipment to the correct addresses of the users, after a common sterilization in a central laboratory for this purpose. Furthermore, it is emphasized that said isolation membrane, in addition to the provided physiological isolation, also may provide electrical isolation; which may be of decisive importance if current leakages occur during medical measurements. Lately special attention has been focused on this problem.

Further the present device has the additional advantage that the associated gas or liquid circuit is not opened to the surroundings if the pressure sensor is removed from the pressure chamber; as it has been experimentally shown that said isolation membrane easily may be made sufficiently strong to withstand the pertinent pressures, without being too stiff in comparison with the pressure sensitive membrane.

Thus, the pressure sensor may be replaced or removed from the pressure chamber e.g. for adjustment or calibration, without influencing the associated circuit.

The invention will now be explained in more detail with reference to the accompanying drawing, wherein:

FIG. 1 diagrammatically shows a prior art measuring device of common design;

FIG. 2 diagrammatically shows a measuring device according to the invention, and FIG. 2a is an enlarged cut-away view of the parts adjacent the membrane edges, as shown in FIG. 2.

A prior art device of the present type consists as shown in FIG. 1 of a pressure sensor T and an open pressure chamber K. By means of threads S the pressure Sensor T is screwed in liquid tight manner into the housing encompassing chamber K, in such a way that the membrane M of said sensor is placed in direct contact with the liquid or gas, the pressure of which is to be measured, and which is supplied to the chamber K through one of or both the shown inlets N.

The pressure which the membrane M senses, is transferred, as indicated in the figure, to an electromechanical transducer 0 disposed inside the pressure sensor and operative to emit an electric signal dependent of the sensed pressure, via the electric output terminals U. These signals may then be supplied to a suitable electrical indication instrument for analog display of the prevailing pressure in the chamber K.

As it will be evident from FIG. 1 and the above description, this known device is arranged in such a way that the pressure sensor T, and in particular its membrane M, is placed in contact with the medium in the chamber K.

This implies, as mentioned above, that the pressure sensor T must be sterilized prior to each measuring process, and that liquid or gas only may be supplied to the chamber K when the sensor is assembled with the pressure chamber by means of the sealing tapping attachment S.

As previously stated, these features give rise to substantial disadvantages, which, however, may be completely avoided by use of a measuring device in accordance with the invention. An embodiment of such a device is shown in FIG. 2 and 2a, the corresponding parts of these figures being designated with the same reference letters as in FIG. 1. The outer housing of the pressure chamber K is in this case connected to the pressure sensor T by means of snap means Sp. The membrane M of the pressure sensor T is attached to a stylus F, which transfers the sensed pressure to an electromechanical transducer 0 of the type which is described in the applicant's U.S. Pat. No. 3,474,681 as an electromechanical transducer of the strain gauge type including an elastic bar of semiconductor material having semiconductor elements diffused therein for varying an externally supplied electric current when strain is imposed on said bar and elements. In response of said pressure the transducer generates electric signals to be emitted via the output terminals 0, for analog indications, as stated above with reference to FIG. 1.

However, in this case the pressure in the chamber T is not transferred directly to the pressure sensitive membrane M, but via an impervious isolation membrane Z, which completely isolates the pressure chamber K from the membrane M. The membrane Z is fastened, e.g., by means of an adhesive, without tension across that opening of the chamber K which faces the pressure sensitive membrane M, in such a manner that the membrane Z comes in intimate surface contact with the membrane M. Due to the essentially tensionless isolation membrane, and the fact that the membrane Z has substantially less rigidity than the membrane M, the pressure sensitive membrane will sense practically the whole outward directed pressure in the chamber K. In this situation said pressure sensitive membrane is preferably designed to have a substantially smaller diameter than the isolation membrane Z, to avoid the transfer of significant parts of the pressure forces to the fixed edge of the isolation membrane.

The isolation membrane Z may be manufactured from any suitable material, e.g. a thin plastic sheet, which by means of practical tests has proved to be suitable to the present purpose.

Said isolation membrane may alternatively be clamped between the rest of the pressure chamber and the pressure sensor, or be moulded together with the rest of the pressure chamber to form one integral piece.

I claim:
1. An improved device for measurement of physiological fluid pressure comprising:
    a pressure sensor provided with a pressure sensitive membrane for sensing the pressure of a fluid within a fluid circuit;
    a housing presenting a hollow pressure chamber, said housing including an integral external wall segment presenting a fluid impervious membrane disposed in fluid sealing relationship with respect to a peripheral area of said hollow chamber;
    means for connecting said housing to said circuit with said chamber in fluid communication with the interior of the circuit; and
    means for detachably securing said sensor to said housing with said membranes disposed in facing relationship and in intimate pressure transmitting surface contact with one another,
    said fluid impervious membrane being of substantially less rigidity than said pressure sensitive membrane to thereby isolate the pressure sensor from the chamber without substantially effecting the measurement of pressure thereby,
    whereby the sensor may be detached from the housing while the latter remains connected to the circuit and without affecting the pressure in the circuit, and whereby the housing and its fluid impervious membrane may be presterilized prior to the attachment thereof to the sensor.

* * * * *